United States Patent Office 2,861,066
Patented Nov. 18, 1958

2,861,066

METALLISABLE AZO DYESTUFFS

Herbert Francis Andrew, Harold Charles Boyd, and Robert Ronald Davies, Manchester, England, assignors to Imperial Chemical Industries Limited, London, England, a corporation of Great Britain No Drawing. Application October 31, 1955
Serial No. 544,082

Claims priority, application Great Britain
November 3, 1954

2 Claims. (Cl. 260—155)

This invention relates to metallisable azo dyestuffs and more particularly it relates to metallisable azo dyestuffs derived from heterocyclic compounds containing hydroxy groups.

It has been proposed in co-pending U. S. application Serial No. 464,595 to manufacture metallisable azo dyestuffs characterised in that they contain the group:

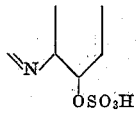
OSO₃H wherein the nitrogen atom is part of a heterocyclic ring, by a process which comprises sulphating azo compounds containing the group

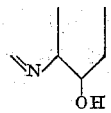
OH wherein the nitrogen atom is part of a heterocyclic ring.

We have found that valuable metallisable azo dyestuffs are also obtained by acylation of azo compounds containing the said group:

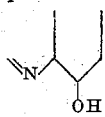
OH wherein the nitrogen atom is part of a heterocyclic ring, by means of certain acylating agents which are such that the introduced acyl group contains a solubilising group.

Thus according to our invention we provide new metallisable azo dyestuffs characterised in that they contain the group:

O.B.X.Y wherein the nitrogen atom is part of a heterocyclic ring and wherein B stands for CO or SO₂, X stands for a bridging group and Y stands for CO₂H, SO₃H or for a quaternary ammonium group of the form —N(tert)- anion.

As suitable bridging groups in the above formula there may be for example the groups —C₆H₄—, —C₄H₂O— and —C₆H₄—CH₂—.

According to a further feature of our invention we provide a process for the manufacture of the said new metallisable azo dyestuffs which comprises treating azo compounds containing the group:

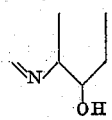
OH wherein the nitrogen atom is part of a heterocyclic ring with an acylating agent as hereinafter defined.

Acylating agents suitable for use in the said process include functional derivatives of the acids of the formula

HO.B.X.Z wherein B and X have the meaning stated above, and wherein Z stands for a CO₂H group, a SO₃H group or for a tertiary amino group. When Z stands for a tertiary amino group the product first obtained is subsequently quaternised.

Such functional derivatives include for example, and especially, the acid halides. When such halides are used the acylation is conveniently carried out in the presence of a base for example a tertiary amine, for example pyridine and triethylamine, or in the presence of an inorganic base for example an alkali or alkaline earth metal hydroxide or carbonate. The reaction may if desired be carried out in an organic solvent, for example dimethyl formamide, and when an inorganic base is used, the reaction may conveniently be carried out in aqueous medium, with or without the addition thereto of an organic solvent.

Other suitable acylating agents are functional derivatives of the acids of the formula:

HO.B.X.Hal wherein Hal stands for a halogen atom not directly attached to an aromatic nucleus; the halogen atom in the product first obtained is converted to a quaternary ammonium group of the form N(tert) anion for example by reaction with a tertiary amine. In this case it is preferred to carry out the treatment with the acylating agent in the presence of a tertiary amine, inasmuch as this acts not only as an acid-binding agent to facilitate the acylation but also as an agent for converting the halogen atom to a quaternary ammonium group of the form N(tert) anion.

According to yet a further feature of our invention we provide a process for the manufacture of those of the said new metallisable azo dyestuffs wherein Y stands for the CO₂H group or for the SO₃H group which comprises interaction of the said azo compounds containing the group

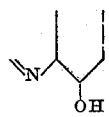
OH wherein the nitrogen atom is part of a heterocyclic ring with an appropriate acid or salt thereof, in the presence of a tertiary amine, and a reactant capable of bringing about the formation of a halide of the said acid. The appropriate acid is of the formula HO.B.X.CO₂H or HO.B.X.SO₃H, wherein B and X have the meaning stated above.

As tertiary amines there may be used for example pyridine and as reactants capable of bringing about formation of the acid halide there may be used for example phosgene, or a halide of an aromatic acid for example p-toluenesulphonyl chloride.

The reaction may be carried out for example in an organic solvent, preferably an amide, such as dimethylformamide.

It is believed, though this hypothesis is advanced only by way of explanation, that the acid halides derived from the said appropriate acids may react in different ways, depending on the conditions of the reaction, and more particularly on the medium in which the reaction takes place.

Thus, for example, a monohalide derived from a dibasic acid of the formula:

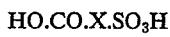
HO.CO.X.SO₃H wherein X stands for a bridging group, may react either as a sulphonyl halide of the formula:

HO.CO.X.SO₂.W wherein X stands for a bridging group and W stands for a halogen atom, or as a carboxylic acid halide of the formula:

W.CO.X.SO₃H wherein X stands for a bridging group and W stands for a halogen atom, depending on the reaction conditions. The result is that the product may be a derivative of either of the acyl groups present in the said acid, or a mixture of the possible derivatives.

The starting materials for use in the said processes are obtainable for example by coupling a diazotised primary aromatic amine with a coupling component containing the stated group. Such coupling components include for example 8-hydroxyquinoline, 1-hydroxyacridine and 4-hydroxybenzthiazole. As primary aromatic amines which may be diazotised and coupled with the coupling components there may be used monoamines for example aniline and p-nitroaniline, and there are particularly to be mentioned certain diamines, for example benzidine, dianisidine, 4:4′-diaminobenzene, 4:4′-diaminobenzanilide, 3′:4-diamino-3:4′-dimethoxybenzanilide, 4:4′-diaminodiphenylamine, 1:5-diaminonaphthalene and 4:4′-diaminodiphenylurea. The diazotisation of the primary aromatic amine and the coupling of it with the appropriate coupling component may be carried out according to known procedures. The starting materials may also be obtained by processes comprising the linking together of compounds for example of azo dyestuffs with one another or with other suitable compounds, provided always that the compounds used are so selected that the final starting material contains at least once the stated group.

The new dyestuffs of the invention are particularly useful for the dyeing of cellulosic fibres and fabrics by the known alkaline after-coppering processes, for example by treatment with a solution containing a copper salt and monoethanolamine. For use in these processes, one preferred class of dyestuffs is that in which there is no solubilising group present except the carboxylic acid group, the sulphonic acid group or quaternary ammonium group in the acyl group —B.X.Y.

The acyl group —B.X.Y. in the said group:

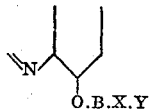

is removed in the process of alkaline after-coppering with the result that the coppered dyestuff is fixed on the fibre as an insoluble substance. Consequently the coppered dyeings possess a very high degree of fastness to washing and this fastness to washing is obtained without the use of dye-fixing agents. The after-coppered dyeings also possess a high degree of fastness to light.

The dyestuffs of this invention in which the group —B.X.Y. contains a quaternary ammonium group are particularly useful owing to the very high degree of exhaustion of the dyestuffs from the dyebath from which they are applied to the fibre.

One preferred class of dyestuffs of the invention is that obtained by the said acylation of the product obtained by coupling a tetrazotised diamine of the formula:

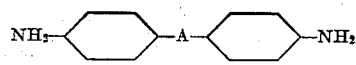

wherein A stands for a direct linkage or for a bridging group for example —N=N—, —CONH—, NH or —NH—CO—NH— and wherein the aromatic nuclei may be further substituted by for example alkoxy groups, with for example, two molecular proportions of 8-hydroxyquinoline.

The invention is illustrated but not limited by the following examples in which the parts are by weight.

*Example 1*

1.9 parts of the compound obtained by coupling one molecular proportion of tetrazotised 4:4′-diaminobenzanilide with two molecular proportions of 8-hydroxyquinoline are suspended in 5 parts of pyridine, 4 parts of m-sulphobenzoyl chloride are stirred in and the resulting mixture is heated at 80° C. for 20 minutes. The mixture is added to 50 parts of cold water and filtered. The solid residue is heated with a mixture of 50 parts of water and 40 parts of 2 N aqueous sodium carbonate solution, and the solution so obtained is filtered. The filtrate is allowed to cool, and is then filtered. The solid residue is washed with 5 parts of ethanol and dried. The product is soluble in water to give a dark red solution which dyes cellulosic fibres by an alkaline after-coppering process to give orange shades of excellent fastness to washing and good fastness to light.

By replacement of the compound obtained by coupling one molecular proportion of tetrazotised 4:4′-diaminobenzanilide with two molecular proportions of 8-hydroxyquinoline by an equivalent amount of the compound obtained by coupling one molecular proportion of tetrazotised 4:4′-diamino-3:3′-dimethoxydiphenyl with two molecular proportions of 8-hydroxyquinoline there is obtained by the procedure of this example a product which dyes cellulosic fibres by an alkaline after-coppering process to give rubine shades of excellent fastness to washing and to light.

*Example 2*

1.5 parts of the compound obtained by coupling one molecular proportion of terazotised 4:4′-diaminoazobenzene with two molecular proportions of 8-hydroxyquinoline are suspended in 5 parts of pyridine and acylated with m-sulphobenzoyl chloride in the manner described in Example 1. The reaction mixture is added to 100 parts of water and is then heated to 70° C. and is then filtered. The filtrate is salted to 15% w/v with common salt, is then filtered and the solid residue is washed with 5 parts of ethanol, and dried. The product is soluble in water to give a brown solution which dyes cellulosic fibres by an alkaline after-coppering process to give violet shades of excellent fastness to washing and good fastness to light.

*Example 3*

7 parts of 2-carboxyfurane-5-sulphonic acid are dissolved in 40 parts of pyridine, with stirring, and 2 parts of the compound obtained by coupling one molecular proportion of tetrazotised 4:4′-diaminobenzanilide with 2 molecular proportions of 8-hydroxyquinoline are added. Phosgene is then introduced into the mixture at 30–40° C. over a period of 90 minutes and the reaction mixture is then heated at 90–95° C. for 30 minutes. The mixture is added to 600 parts of cold water and filtered. The solid residue is dissolved in a mixture of 200 parts of water and 30 parts of 2 N aqueous sodium carbonate solution, and to this solution 15 parts of common salt are added. The mixture is filtered and the solid is mixed to a slurry with 100 parts of ethanol, the suspension is filtered, and the residue is washed with 10 parts of ethanol, and dried. The product dissolves in water to give an orange-red solution which dyes cellulosic fibres by an alkaline after-coppering process to give orange shades of excellent fastness to washing and good fastness to light.

A dyestuff, giving shades, identical with those produced by the dyestuff made by the procedure of the above Example 1, is obtained by substitution of 2 parts of 2-carboxyfuran-5-sulphonyl chloride for the 4 parts of m-sulphobenzoyl chloride in the procedure of Example 1.

Example 4

4 parts of the compound obtained by coupling one molecular proportion of tetrazotised 4:4'-diaminobenzanilide with two molecular proportions of 8-hydroxyquinoline are dissolved, with stirring, in 90 parts of pyridine at 100° C. 15 parts of m-chloromethylbenzoyl chloride are added and the mixture is heated, with stirring, at 80° C. for 2 hours, and is then cooled to room temperature and filtered. The solid residue is purified by solution in 200 parts of alcohol and precipitation with acetone, and is then dried. The product dissolves readily in water to give an orange solution which dyes cellulosic fibres by an alkaline after-coppering process to give orange shades of excellent fastness to washing and good fastness to light.

Example 5

10 parts of a solution obtained by dissolving 1 part of the dyestuff made by the procedure of Example 1 in 200 parts of boiling water are diluted with 140 parts of water and the dyebath thus obtained is heated to 85° C. 5 parts of cotton, viscose rayon or other cellulosic fibre are immersed in the dyebath, and dyeing is continued at 85° C. for 45 minutes during which time a total of 2 parts of common salt are added at convenient intervals. The fibre is removed from the dyebath, rinsed in cold water, and immersed for 20 minutes at 60° C. in a bath containing 0.15 part of crystalline copper sulphate and 1 part of monoethanolamine in 150 parts of water. The fibre is then rinsed and dried. It is thus dyed in orange shades of good fastness to light and very good fastness to washing.

Example 6

2.69 parts of the compound obtained by coupling one molecular proportion of 4:4'-diaminobenzanilide with two molecular proportions of 8-hydroxyquinoline are suspended in 10 parts of pyridine, 5 parts of p-dimethylaminobenzoyl chloride are added and the mixture is stirred and heated at 90° C. for 1 hour. The mixture is filtered and the solid residue is washed with 30 parts of water and 10 parts of acetone. The residue is then stirred with 10 parts of dimethyl sulphate at 110–120° C. for 15 minutes after which time a test sample is soluble in water. The mixture is poured into 50 parts of water and filtered. The filtrate is treated with 25 parts of saturated brine and filtered. The solid residue on the filter is washed with 30 parts of water and dried. The product so obtained dissolves in water to give a red solution which dyes cellulosic fibres by an alkaline after-coppering process to give orange shades of good fastness properties.

What we claim is:

1. A metallizable azo dyestuff of the formula:

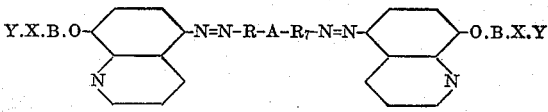

wherein R and R' are monocyclic aryl radicals selected from the group consisting of phenylene and methoxyphenylene radicals; B is selected from the group consisting of CO and $SO_2$; X is selected from the group consisting of —$C_6H_4$—; —$C_4H_2O$—; and —$C_6H_4$—$CH_2$—; A is selected from the group consisting of a direct linkage —N=N—; —CONH—; —NH—; and

—NH—CO—NH— and Y is selected from the group consisting of $CO_2H$, $SO_3H$ and a quaternary ammonium group of the form —N(tert) anion.

2. A metallizable azo dyestuff as defined in claim 1 wherein R and R' are phenylene radicals.

References Cited in the file of this patent

UNITED STATES PATENTS

| | | |
|---|---|---|
| 1,405,687 | Haugwitz | Feb. 7, 1922 |
| 2,283,294 | Straub et al. | May 19, 1942 |
| 2,495,244 | Felix et al. | Jan. 24, 1950 |

FOREIGN PATENTS

| | | |
|---|---|---|
| 643,699 | Germany | Apr. 15, 1937 |
| 1,045,850 | France | July 1, 1953 |